May 20, 1930.  R. F. MORRISON  1,759,411
PLASTIC CANDY FORMING MACHINE
Filed July 21, 1926   9 Sheets-Sheet 3
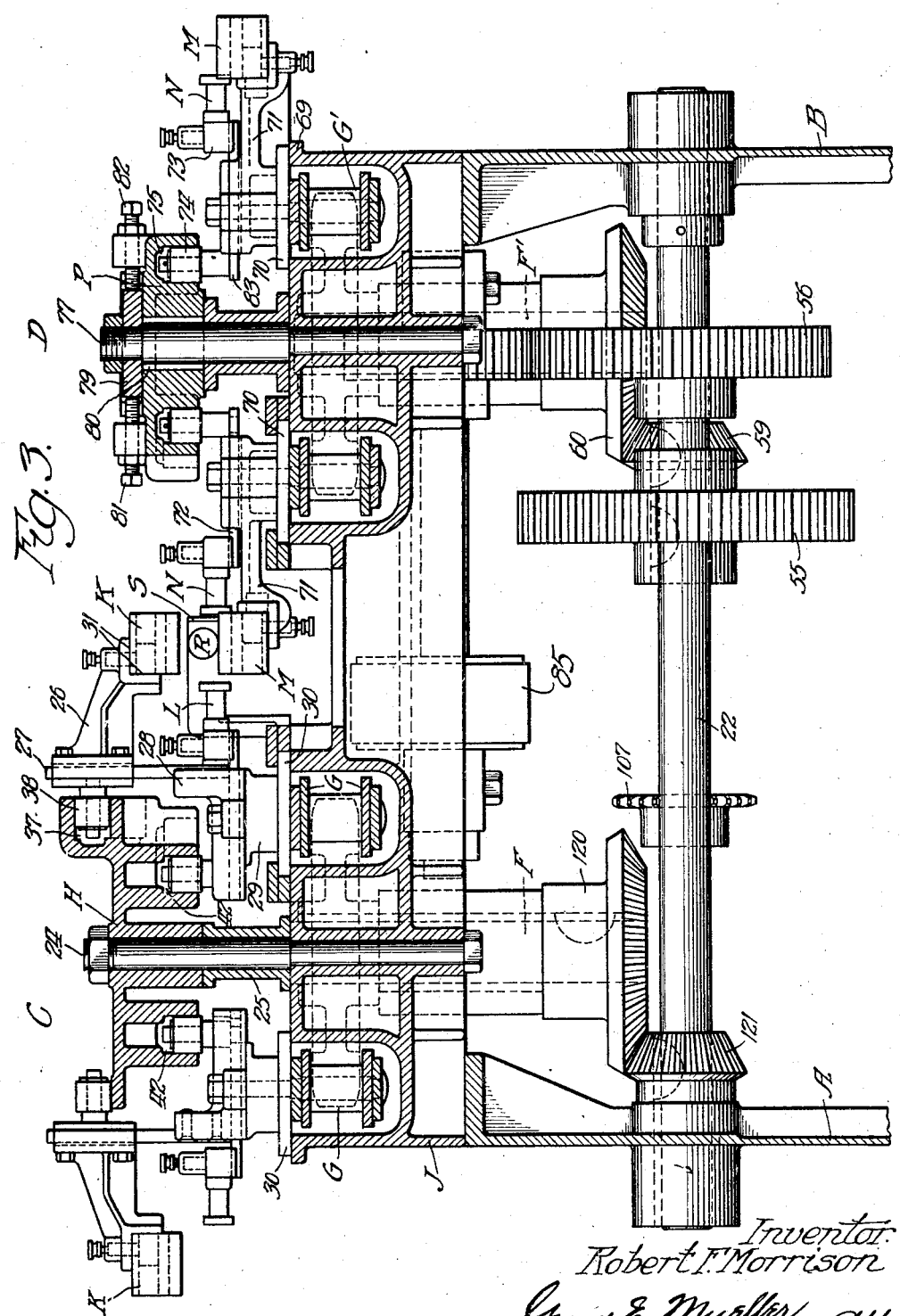
Inventor:
Robert F. Morrison
George E. Mueller Atty.

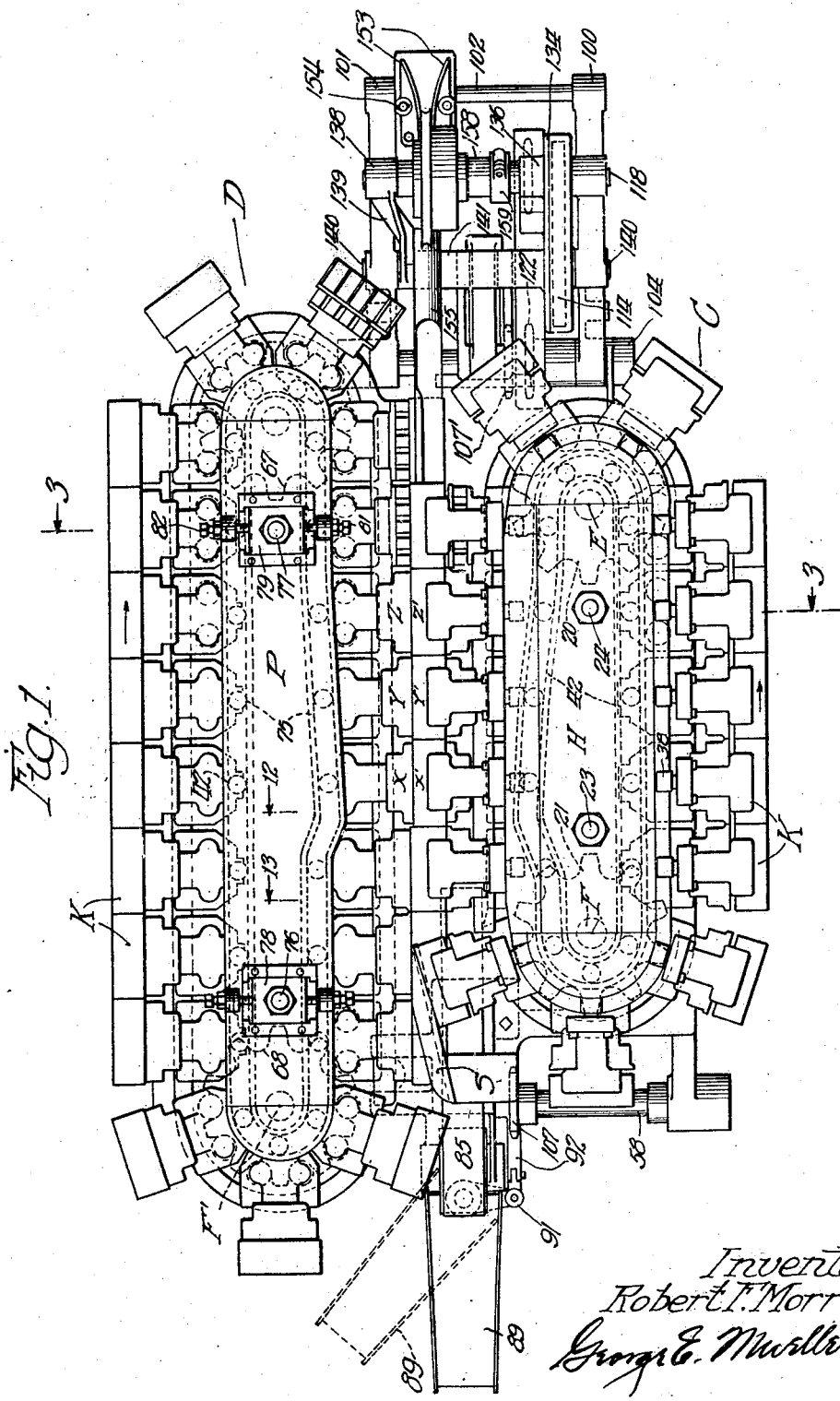

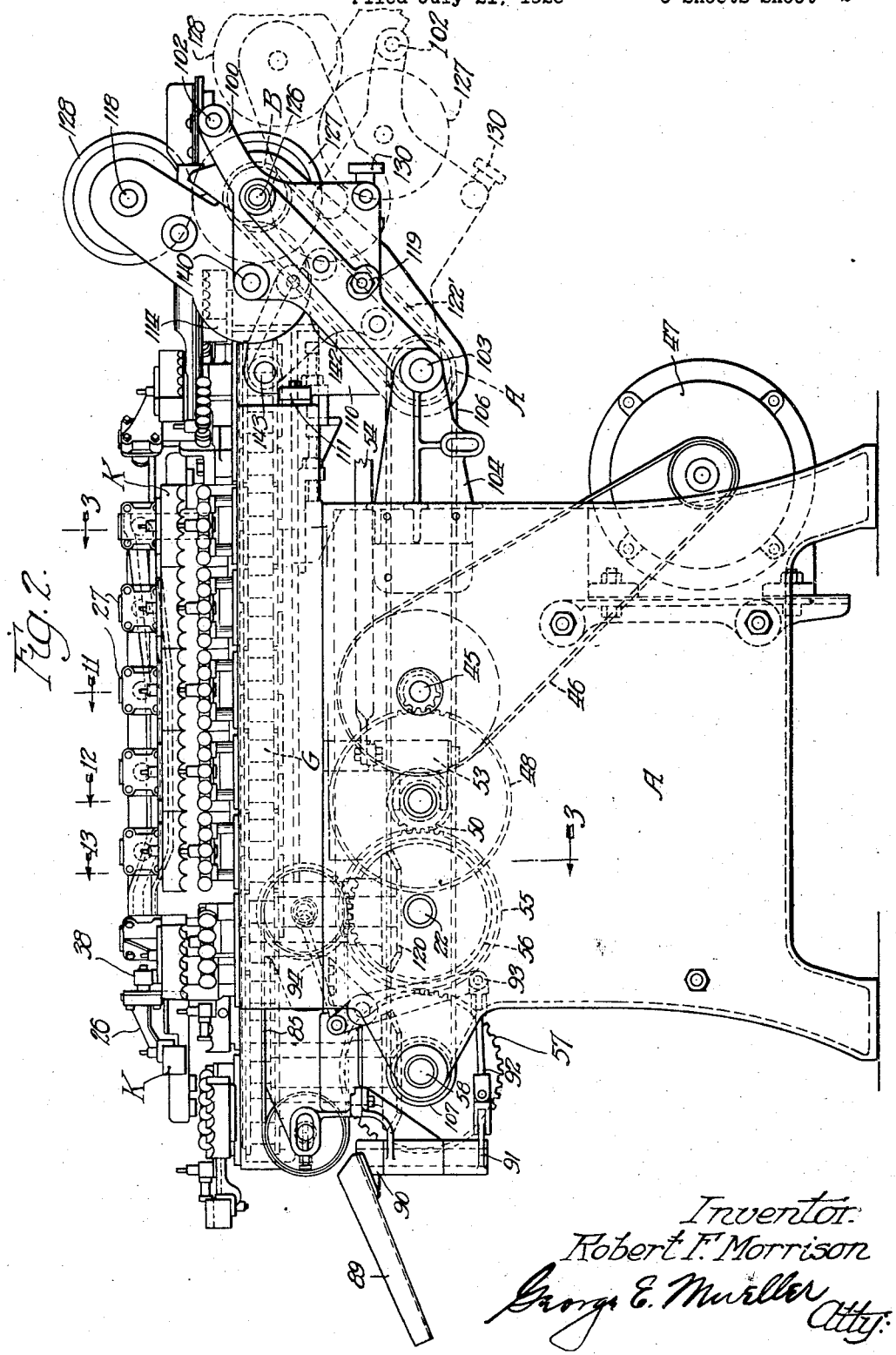

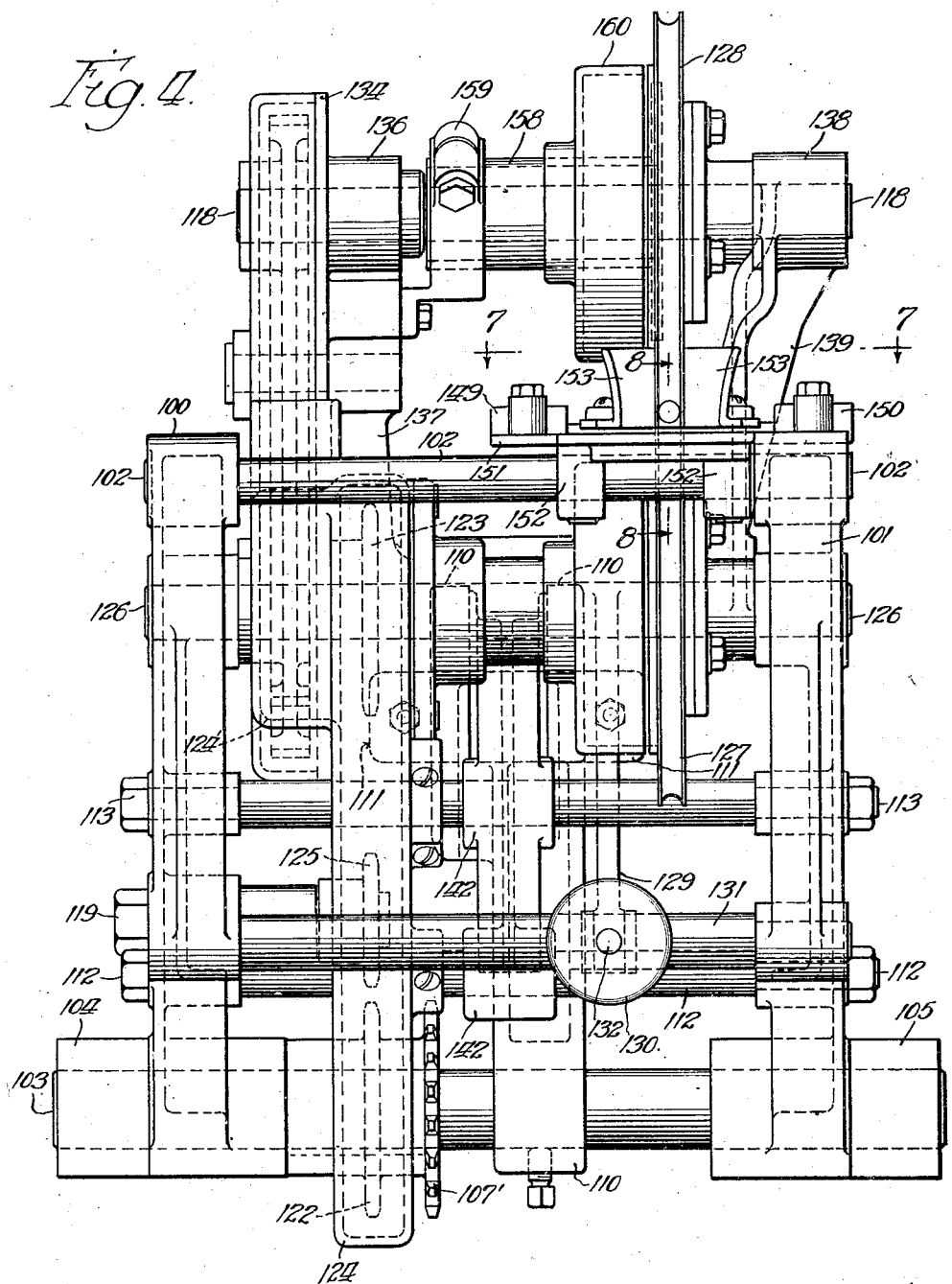

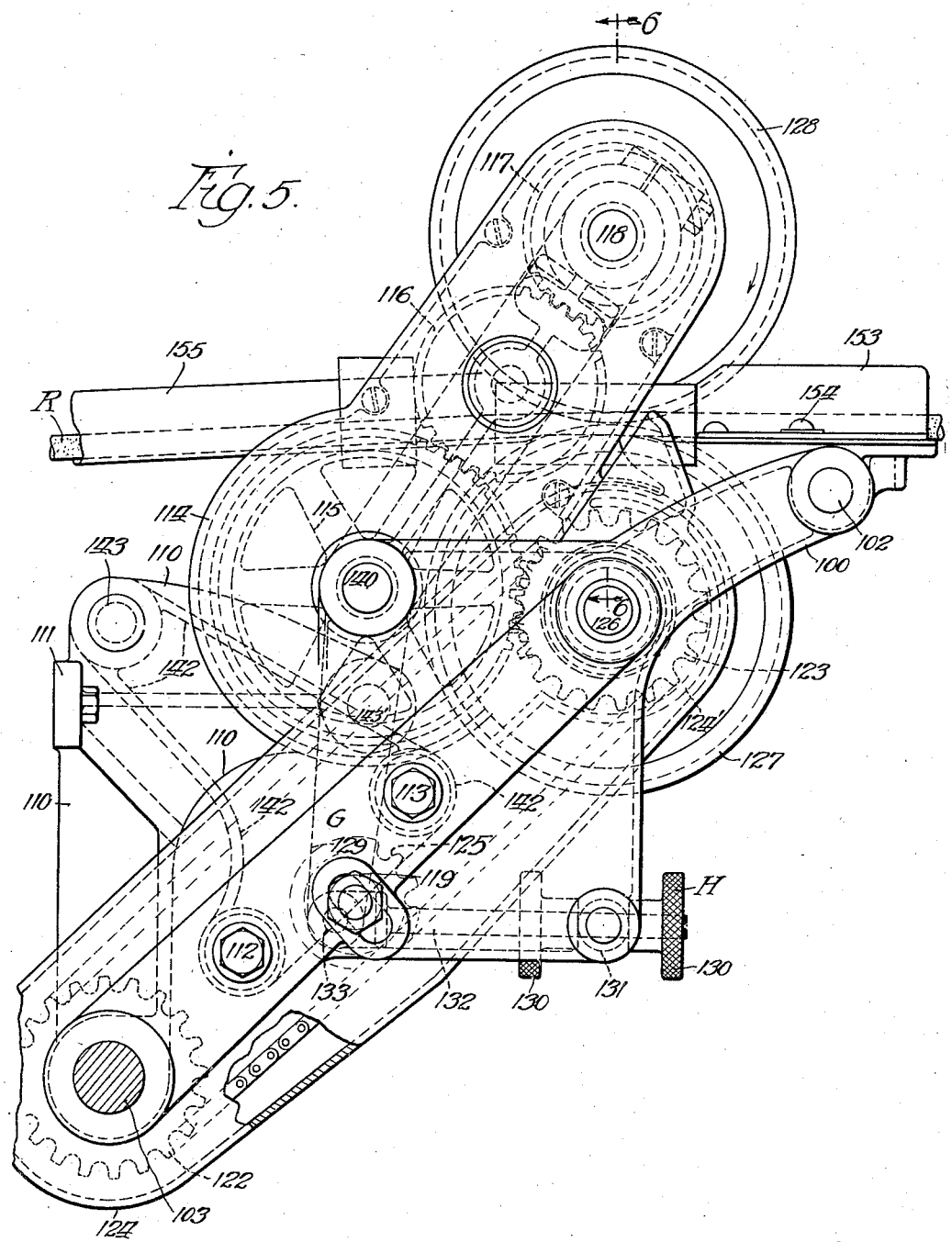

May 20, 1930.   R. F. MORRISON   1,759,411
PLASTIC CANDY FORMING MACHINE
Filed July 21, 1926   9 Sheets-Sheet 6
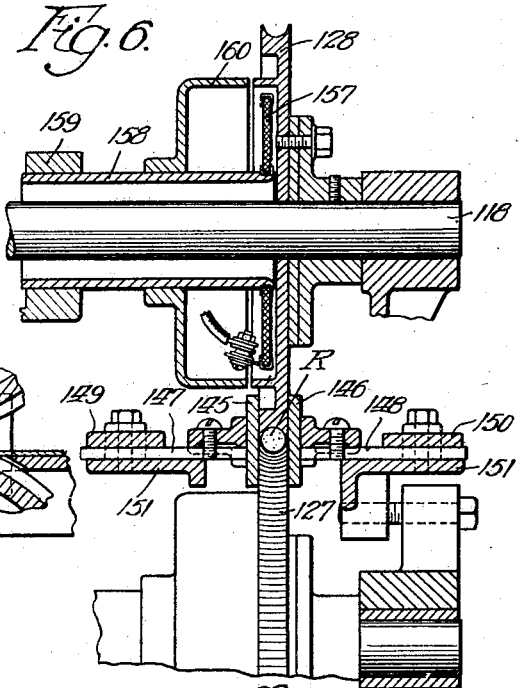
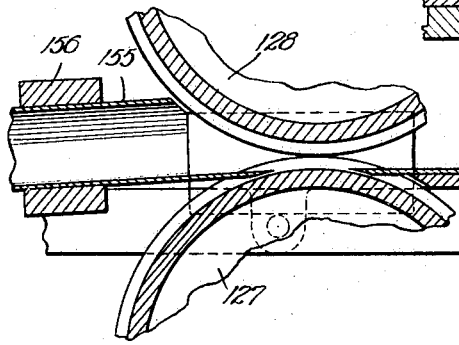
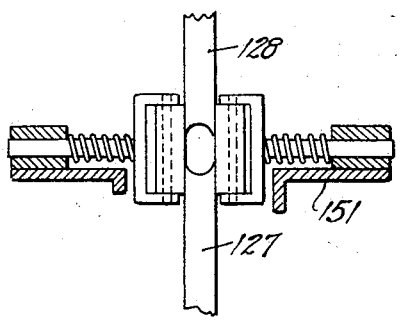
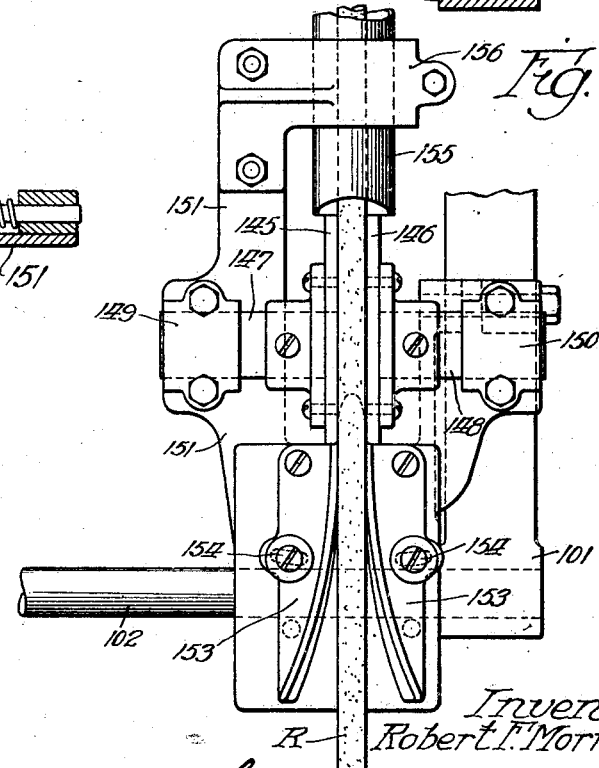
Inventor
Robert F. Morrison
George E. Mueller Atty.

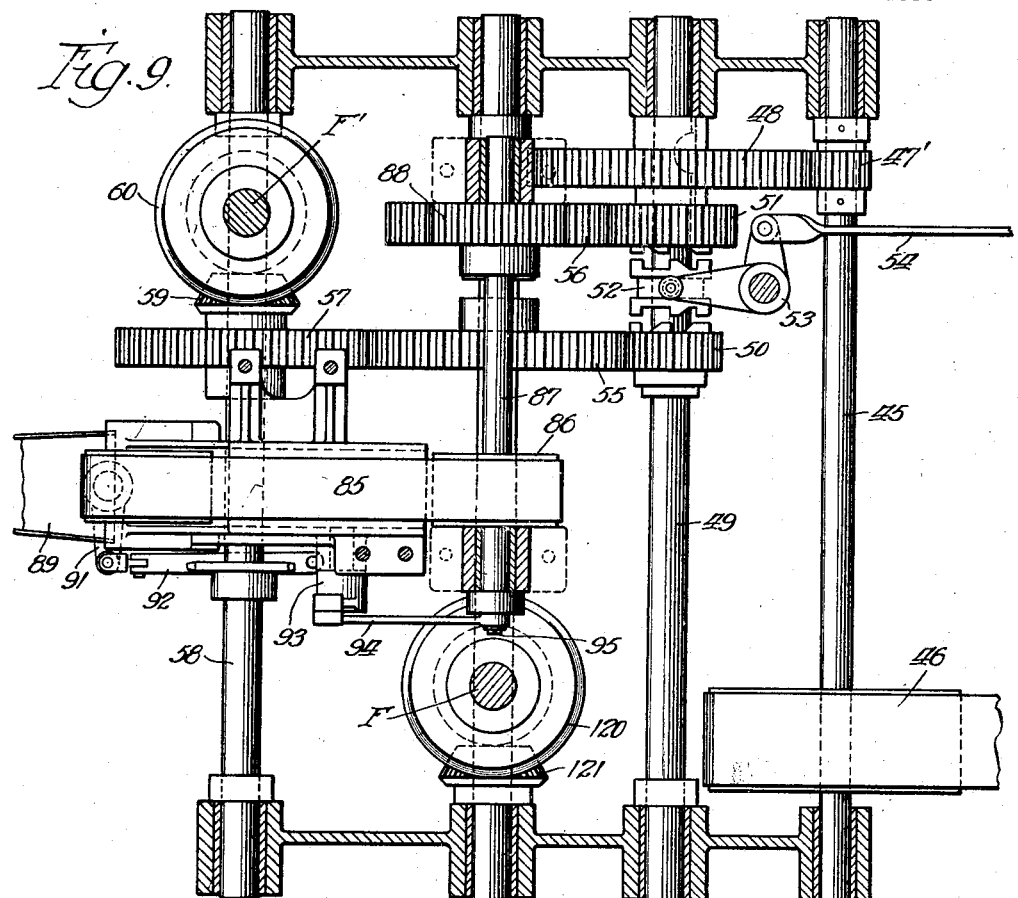

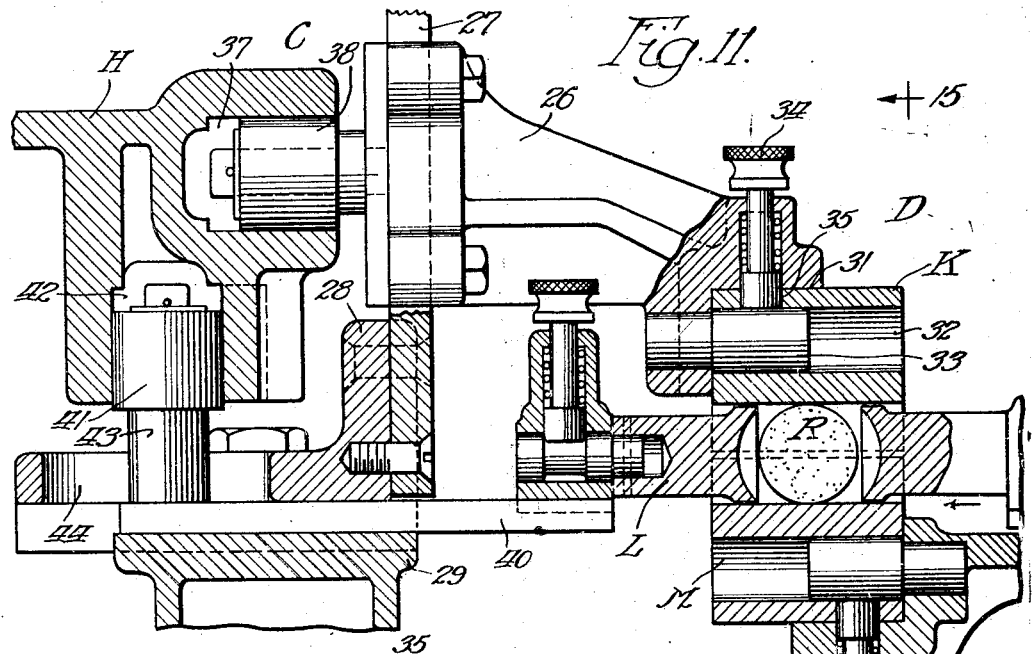
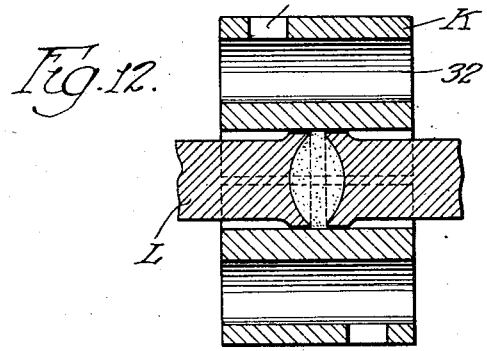
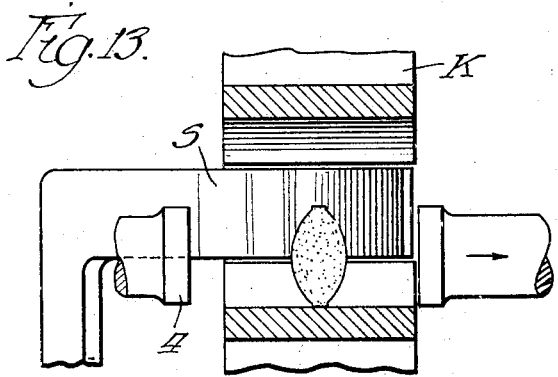

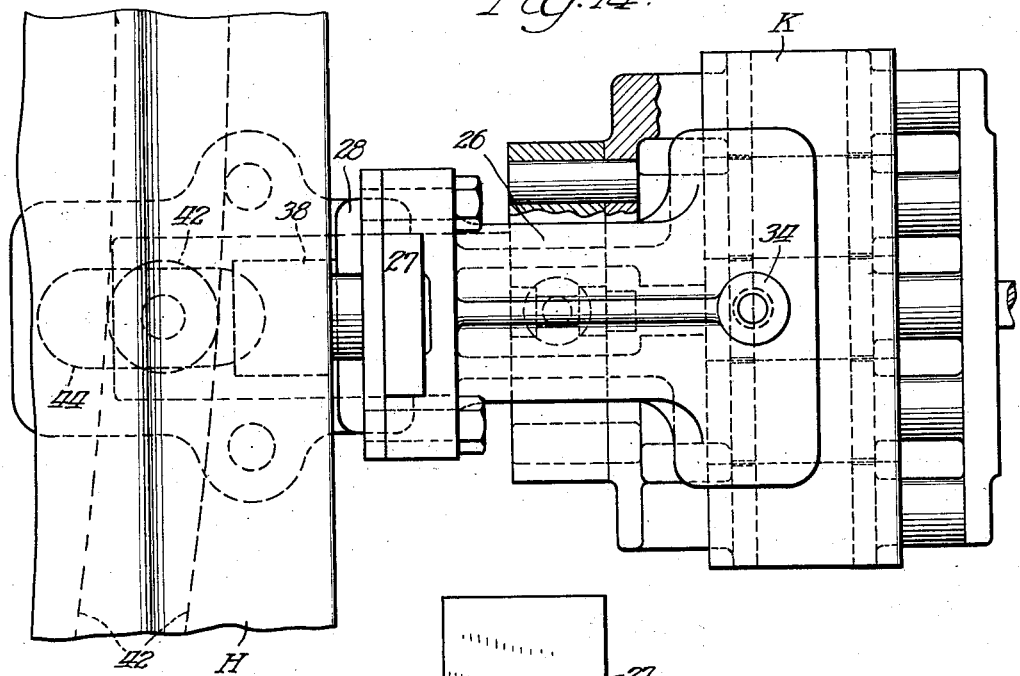
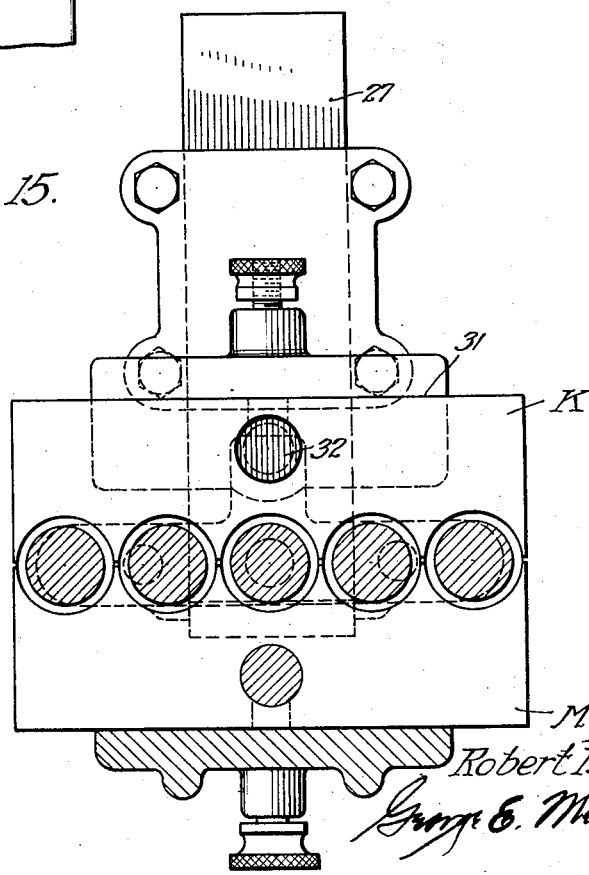

Patented May 20, 1930

1,759,411

UNITED STATES PATENT OFFICE

ROBERT F. MORRISON, OF OAK PARK, ILLINOIS, ASSIGNOR TO ELDER & ROBINSON CO., OF CHICAGO, ILLINOIS, A CORPORATION OF ILLINOIS

PLASTIC-CANDY-FORMING MACHINE

Application filed July 21, 1926. Serial No. 123,846.

My invention relates to plastic candy forming machines and has to do more particularly with machines of the above character having a plurality of cooperating die elements traveling over continuous paths so as to provide a plurality of successively operating dies for forming different shapes of candy pieces from a continuous plastic rope of candy.

An object of my invention is to provide an improved machine of the above character having many features and advantages which will be more particularly pointed out in the ensuing portion of the specification and the appended claims.

For a better understanding of my invention reference is to be made to the accompanying drawings, in which,—

Fig. 1 is a top plan view of the machine;

Fig. 2 is a front side elevation of Fig. 1;

Fig. 3 is a vertical transverse sectional view through the rear chain sprocket carrying spindles and some of the press mechanism carried thereby along the line 3—3 of Figs. 1 and 2;

Fig. 4 is an enlarged end view of the rope forming mechanism at the rear end of the machine;

Fig. 5 is an enlarged side elevation of the mechanism of Fig. 4;

Fig. 6 is a sectional view along the lines 6—6 of Fig. 5; showing more particularly the rope forming rolls and heating mechanism therefor;

Fig. 7 is a top plan view of the bottom forming roll and entrant and discharge rope guides therefor;

Fig. 7ª is a detail view of the sizing rolls;

Fig. 8 is a side view in section, showing portions of the forming rolls;

Fig. 9 is an enlarged view of the driving gearing and the candy discharging or take-off belt mechanism;

Fig 10 is a diagrammatic development of the cam surface for operating the different elements of the die or press;

Fig. 11 is an enlarged sectional view through one of the presses showing the dies in their compressing operation, which is at position 11 of Fig. 2;

Fig. 12 shows the dies in forming position which is a little further on in the movement at position 12 of Fig. 2;

Fig. 13 shows the dies separated again with the scraper just being engaged to scrape the formed candy off the dies to drop on to the take-off belt, this being at position 13 of Fig. 2;

Fig. 14 is a top plan view of one of the press mechanisms and a portion of the actuating cam; and Fig. 15 is a right end view of Fig. 14 and along the line 15—15 of Fig. 11.

Before taking up in detail the preferred construction of my machine as illustrated herein, I might say that in general it includes a plurality of press elements carried upon traveling chains in such a way that although separated die elements of the presses travel on different supports, they meet along the center of the machine with the plastic candy rope passing in between the elements which during their forward travel come together to form desired shapes of candy pieces by dies which may be readily replaced, according to the shape wanted. As the press elements continue in their coacting travel the candy is fully formed and then the press elements separate so as to permit a removal of the formed pieces by a scraper which drops these pieces on to a take-off belt by which they are carried to a distributor which scatters them over a wider belt on which they are carried away to be packed or otherwise disposed of.

Referring now more in detail to the preferred construction as illustrated, I provide a suitable frame including sides A and B, upon which the mechanism is mounted and between which the driving gearing is supported. On top of this frame I support the press mechanism adapted to successively operate the dies and consisting of chain carrying portions C and D, each including a suitable die carrying element preferably in the form of a chain supporting a number of successive press elements, the portion D carrying what might be said to be half of a press, which includes a lower die and a side die, and the other portion similarly carrying a half press, which includes a top die and side die.

Thus as the chains travel around on their supported sprockets the die halves come together into compressing operation.

As to the press part C, this includes a suitable die carrying means in the form of a chain mounted upon vertical shafts E and F, upon which the sprockets are mounted. The said chain G includes suitable links and connecting pins, the chain being supported upon the sprockets 20—21. These sprockets are supported upon suitable vertical shafts, sprocket 20 being carried upon shaft E and sprocket 21 being carried by shaft F which is the driving shaft and carries a bevel gear 120 (Fig. 3) at its lower end in mesh with gear 121 carried by shaft 22, which is driven from the main power means as will hereinafter be described.

Referring now to the chain G which supports the die members of section C, this chain as illustrated includes fifteen blocks or fifteen die sections which travel over a continuous path to successively engage and cooperate each with one of the die sections carried upon the opposite side of the machine.

The die blocks of section C as they are advanced over their operating path are actuated by a suitable cam mechanism preferably in the form of a stationary ring cam H supported upon posts 23—24. In Fig. 3 this is shown more in detail in section, the post 24 extending through the bed plate J which rests upon and is secured to the frame sides A—B. This post 24 extends through a spacing collar 25 which rests upon the bed plate J, all of the elements being clamped together by the nuts upon the opposite end of the post 24.

Now as to the die operating mechanisms which travel along in sections C and D, I will describe these units and which are more clearly illustrated in Figs. 3 and 11 to 15. Each of the die heads of section C includes supports for the upper and side dies, the support for the upper die having a vertical reciprocation and the support for the side die having a transverse reciprocation. The top die support includes an arm 26 slidingly supported upon a vertical standard 27 fastened to the bracket 28, the latter being attached to a block 29 carried by the slide plate 30 which is attached to and advanced by a chain G. At the end of arm 26 I mount the upper die block K, this being preferably readily removably secured so as to permit an easy interchange of dies. To this end the die block K fits into an angular corner 31 of the arm 26, said block K also having a transverse socket 32 which fits over a stud 33 projecting from one of the faces of the angular rest 31. Thus with the die block K resting against the upper face of the corner 31 and the socket 32 fitting over the stud 33, the die block K is rigidly supported upon its carrying arm 26. In order to hold the die block in position I provide a spring held stud 34, the lower end of which slides into an opening 35 of the die block K, after it has slipped in place. Thus to remove the block K for inspection or change of dies it is only necessary to pull up the stud 34, slip off the block K and put another one in its place.

The same simple holding mechanism is used for the other three die blocks as will readily be seen as the description of the mechanism continues.

Now as to the operating means for the die arm 26, as previously stated, I preferably provide a stationary ring cam H, and for operating arm 26 a recess or continuous groove 37 is cut into this ring cam H, and a roller 38 for the arm 26 fits within said recess 37.

This recess or groove 37 of the cam H is shaped so as to impart the proper movement to the arm 26 and its die block K, and in Fig. 10 this is developed by the top cutting die line shown along the middle of the figure. As indicated by this operating line, the top die head enters the groove 37 with the die in its uppermost position, as the die approaches a point opposite the axis of rotation E of the chain supporting sprocket. As the die advances it is gradually forced down to its lowermost position and then moved upwardly again before it starts the circular travel at the other end of the machine. As indicated in Fig. 3, the circular cam H at the top does not carry the groove 37 throughout its periphery, but as indicated at the left of this cam H in Fig. 3, the roller 38 merely rests upon an upper surface of the cam. This is because the groove 37 at its upper surface, is needed only during the compressing or cutting action of the top die block.

Now as to the transversely movable or side die L, this is mounted upon a bar 40 slidingly mounted between the chain carrying block 29 and its corresponding bracket 28, said bar 40 having an operating roller 41 mounted on one end thereof, and extending up into the operating groove 42 in the cam H. This roller 41 is rotatably supported upon a shaft having the spacing collar 43 which extends up through the slot 44 in the bracket 28 so as to permit traveling operation thereof. This bracket 28 extends back over its supporting block 29 so as to provide sufficient bearing surface for the slidable bar 40, and thereby give more accurate support therefor.

Referring to the operating groove 42, in the cam H, this extends as a continuous path around the cam and is properly shaped to give the desired reciprocation to the side die L. The operating face of the cam groove 42 is indicated by the line in Fig. 10 corresponding to section C of the machine, this line indicating that the top cutting die starts downward travel and completes its travel before the side die has completed its forming operation.

In other words, the top cutting die starts its downward travel and then the side die L enters the block, after which the upper block or head K comes down to seal the forming chamber before the side dies start compressing the candy into its final shape. After this forming operation is completed the side dies are withdrawn before the top cutting die is raised to clear the formed candy.

The cam groove 42 is shown by dotted lines in Fig. 1, from which it will be observed that the side die L after being withdrawn follows around the turn at the end F and starts back, moving in a straight line until the curve at end E is reached. Of course, all of the press sections on side E carried by the chain G are moving along through this groove so as to receive the proper successive operations.

Referring now to the driving gearing for the press carrying chains, the shaft 22 previously referred to is connected through high and low speed gearing and alternate clutch mechanism back to the driving shaft 45 connected by a belt 46 to the motor 47. The said intermediate gearing includes the driving pinion 47' carried by shaft 45 and in mesh with the gear 48 fixed to shaft 49. This shaft 49 carries two idler pinions 50 and 51, either one of which may be connected to the shaft through the clutch collar 52 which is slidably keyed to shaft 49 and rotatable therewith. This collar 52 is actuated through the bell crank lever 53 connected to the link 54 which extends back to a convenient place to be reached by the operator. With the clutch collar 52 in its central position the gearing is disconnected and the machine inert. By shifting collar 52 into connection with driving pinion 50, the latter is rotated with the shaft 49 and thus rotates gear 55 which is fixed to the shaft 22 to rotate the latter and advance the presses. With the clutch connected as stated the machine is driven at slow speed, but with the clutch collar 52 shifted to its alternate position to engage the gear 51, the machine is driven at a higher speed through the connection between said gear 51 and gear 56 which is fixed to shaft 22.

It will thus be seen that the presses may be advanced at a high or low speed, according to the position of the clutch and as desired by the operator. This variation in speed is desirable as different kinds of candy may be run through at different speeds. It is to be understood also that I contemplate building machines with different speed arrangements than shown herein, as this will depend upon the uses to which the machine is to be put.

The driving mechanism as so far described applies to the operation of the upper die heads of section C, but the gearing is extended to operate or advance the die heads of section D. This is brought about through connection between gear 55 and gear 57 fixed to shaft 58 carrying the bevel gear 59 in mesh with gear 60 fixed to the vertical shaft 61 which carries the driving sprocket for the chain of section D.

Thus whenever shaft 22 is connected with the driving shaft through the clutch mechanism, both vertical shafts F and F' are rotated to drive their respective press carrying chains.

Referring now to the press mechanism of section D, this like the section C includes a chain which drives a plurality of press sections component to those of section C, so that during the operation of the machine opposite sections meet and co-act to press out the candy pieces.

It will be noted from Fig. 1 that there are a different number of press blocks in each of the sections C and D. That is, in section C there are fifteen blocks and in section D twenty-one blocks. The two sets are preferably arranged with a common multiple, that of those shown being 3. In this way the machine may be arranged to turn out a number of different forms of candies, using three different kinds of dies. Thus section C would have five sets of three each and section D would have seven sets of three each. Thus for example a series consisting of three dies X, Y, Z might be shaped for raspberries, balls and ovals and the component set X', Y', Z' the same. Each successive series of three dies following would have the same three shapes. Therefore, the blocks of the series would always meet in proper order although the same two blocks would not come together in successive rotations of the machine.

Referring now to the construction of the die and carrying mechanism of section D, I provide sprockets 67 and 68 supporting a chain G' which advances the press sections upon the track 69. The individual press sections are supported upon a sliding plate 70 which is attached to the chain and to which the arm 71 is rigidly bolted. To the end of arm 71 I attach the base die block M, which is secured to the angular corner of arm 71 the same as the top block K is secured to its arm 26. The transversely movable or plunger die N is mounted upon the bar 72 which is slidingly mounted in the rear portion of arm 71. The plunger die N is held in the mounting 73 in a manner similar to that by which the opposite plunger die L is held.

Thus the four die members K, L, M, N may all be readily removed and replaced by other dies in a very short time, this operation taking but a few minutes to change dies on the entire machine.

The base dies M simply travel along their circuitous route without any vertical movement like the upper dies K, because I preferably simply apply the cutting movement through the upper die and permit the lower die blocks M to travel along on the same plane with the candy rope fed thereto and lying thereon.

The plunger die N has a reciprocating action the same as the component plungers L, and to this end I provide an actuating roller 74 for each plunger, said rollers traveling in a groove 75 in the operating cam P.

In Fig. 1 the shape of this cam groove 75 is indicated by dotted lines and from which it will be seen that there is no transverse movement of the plunger die N until after the blocks have passed beyond the center of the turn, after which the plunger die gradually moves in until full compression is made after which it is moved out again so that the two plungers L and N are sufficiently separated to permit removal of the formed candies.

The travel of the plunger die N is also indicated in Fig. 10 by the movement line of section D.

In order to accommodate the machine for differences that may exist in different sets of dies or for inaccuracies which may occur, I provide adjusting means for the cam mechanism so that a relative adjustment between cams P and H may be made so as to secure the proper cooperation between the plunger dies. To this end I adjustably mount the ring cam P upon studs 76—77 so that lateral adjustment of cam P may be made. To this end I attach blocks 78—79 to the respective studs 76 and 77 and then transversely slot the cam P as at 80 (Fig. 3) where the cam sets over the supporting stud. Adjusting screws as 81 and 82 are then provided for each end so that by operating these screws the cam P may be adjusted toward or away from the operating line of the presses. In this way the cam P may be adjusted relative to the cam H and a proper compressing cooperation of the plunger dies secured.

The cam P rests upon suitable spacing collars 83 so that when clamped in position it will be held in proper elevation to receive the operating rollers 74 in its groove 75.

It will be noted that the presses of section D extend over a greater length than those of section C, that is longitudinally of the machine. There are several reasons for this, one being that it permits the lower candy supporting and cutting die blocks M to come around into position and receive the candy rope from the forming rollers before the upper die block comes into position. Also at the ejecting end of the machine the top die block is clear of the lower die so as to permit the scraper S to clear the dies of the formed candies.

This scraper S is positioned so that as the dies reach the ejecting end of the machine and the candy is fully formed, the scraper is in a position to move the formed candies off of the bottom die and drop them onto the take-off mechanism. The formed candy pieces as they leave the machine after the dies separate come out as a continuous connected strip, but as they come in contact with the scraper and are moved off the dies the pieces are separated through the breaking of the small connection portion. Referring now to the take-off and distributing mechanism, as the candy pieces are scraped off the dies they drop down upon a belt 85 driven from a pulley 86 carried by shaft 87 having a gear 88 in mesh with the gear 56. The latter gear is carried by shaft 22 which rotates whenever the machine is being driven and therefore the belt 85 always moves when the machine is being operated.

In order to separate or distribute the candy pieces so as to secure a more effective cooling thereof without requiring too long a take-off belt, I provide a distributing spout 89 which has a transverse reciprocating motion as indicated by the dotted line position in Fig. 1. This motion is brought about through the supporting arm 90 carried upon the vertical shaft, to the lower end of which an arm 91 is secured. The latter arm is connected by a link 92 to a lever 93 connected by a link 94 to a crank pin 95 eccentrically carried upon the end of shaft 87. Thus through the connections described the spout 89 is moved back and forth to distribute the formed candies over a wider take-off belt, which would be positioned beneath the spout 89 so as to carry the formed candies away to be properly disposed of.

The plastic candy rope may be formed and fed to the machine in any desired manner, but I preferably provide forming and feeding roll mechanism as shown more in detail in Figs. 1, 2 and 4 to 8 inclusive.

In general, this forming or sizing and feeding mechanism includes a pair of sizing rollers adjustably mounted so as to form the candy rope to a desired cross-section, and I also provide an electrical heating means for the rollers so as to bring about a more effective forming of the candy rope and maintain it warm until the compressing operation.

This forming and feeding mechanism is preferably arranged so that it may be moved into operative position when it is to be used for forming the rope, or it may be dropped out of its operating position so that the rope may be formed and fed by hand, as for instance when the machine is to be used only as a cutter with the top and bottom dies in operation and the plunger dies removed. These alternate positions of this forming and feeding mechanism are indicated by the full and dotted lines at the right end in Fig. 2, the full lines showing the mechanism in operating position and the dotted lines indicating the mechanism when dropped down out of operating position.

Referring now more in detail to the construction illustrated, I provide a main frame including two side members 100 and 101 rigidly connected by tie rods 102, 112 and 113, said frame being pivotally supported upon a stationary shaft 103 upon which it swings, so that the frame may be held in its operating position or dropped into a non-operating position. Shaft 103 is supported in brackets 104, 105 fastened to the main frame sides of the machine, and carries a roller driving sprocket 122 connected with sprocket 107' driven by a chain 106 which extends back to a sprocket 107 carried upon driving shaft 58, and thus the sizing rollers which are driven in synchronism with the advance of the dies. Driving sprocket 122 is enclosed within a housing 124 and is connected by a chain with sprocket 123 at the upper end of the housing and which latter sprocket is secured to shaft 126 carrying the lower sizing roller 127. An idler sprocket 125 is positioned in the casing 124 and is supported upon a shaft 119 movable in a slot, so as to take up any slack in the chain 122' which connects the two sprockets 122 and 123. Shaft 126 carries a driving pinion which is positioned in an offset portion or cup 124' on the main casing 124, said pinion being in mesh with the idler gear 115 which is connected through intermediate gear 116 to gear 117 on shaft 118 carrying the upper sizing roller 128. These latter three gears 115, 116 and 117 are enclosed in a suitable housing 114 pivotally supported upon the shaft 140, so that this housing and upper roller 128 carried thereby may be pivoted on shaft 140 to adjust the sizing rollers according to the size of candy rope desired. The upper shaft 118 and roller 128, together with the gear housing 114, are carried upon a U-shaped frame having sides 137 and 139 with bearing portions 136, 138 in which the shaft 118 is mounted. These frame sides 137, 139 extend upwardly from a sleeve 141 (Fig. 1) said elements 137, 139 and 141, together with the gear housing base 134, being formed of a single casting. This U-shaped frame is pivotally mounted upon the shaft 140 and has a downwardly extending arm 129 adjustable by the adjusting nuts 130, so as to swing the upper sizing roller on its pivot 140 for adjustment. The adjusting nuts 130 are threaded upon a connecting rod 132 extending back and pivotally connected at 133 to said downwardly extending arm 129. Thus by loosening one nut 130 and tightening up the other one, the arm 139 is moved correspondingly to swing the upper sizing rod carrying frame for adjustment.

The two sizing rollers 127, 128 have plates 145, 146 (Fig. 6) pressing against the sides where they meet to form the candy rope R, these plates being held in adjustable supports 147, 148 which may be varied to take up for wear. Thus at the point where the candy rope is sized between the rollers, it passes through a closed sizing opening irrespective of the adjustment of the rollers 127, 128. The side plate supports 147 and 148 are held by clamping plates 149, 150, respectively, so as to permit adjustment as stated. Said supports 147, 148 are mounted upon a bracket 151 in the form of a casting having depending lugs 152 supported by the tie rod 102 extending therethrough.

Also supported upon this bracket 151 is a pair of guiding and preliminary rope forming angular members 153 laterally adjustable and adapted to be clamped to the bracket 151 by screws 154. These guiding members 153 have an angular or rounded entrance through which the candy rope R is fed after it is first formed by the hands, being sized in a preliminary way as it passes between these plates 153 before it reaches the final sizing rollers 127, 128.

In order to guide the rope after it leaves the sizing rollers and until it reaches the presses, I provide a tubular member 155 clamped in the end 156 extending laterally from the bracket 151. This tube 155 has its upper half cut away as indicated in Fig. 1, so as to clear the upper die blocks as they come around into position, but at the same time guide the candy rope to the blocks and furnish support therefor until it rests upon the lower blocks. This tube 155 may be readily removed from the clamp 156 by loosening the clamping nuts. This is so as to permit lowering the forming unit out of operative relation with the dies when desired.

It is desirable to heat the sizing rollers while operating, and to this end I provide a heating unit in the form of an electrical disk 157. As shown in cross section at the upper roller in Fig. 6, this heating unit is supported upon a tube 158 clamped in a bracket 159. A protective casing 160 is also supported upon the tube 158 and encloses the heating element so as to protect the same and retain the heat in more intimate relation with the roller. Thus the entire heating unit with its protective covering is held stationary but clear of the moving elements which it surrounds. The lower roller 127 has a similar heating unit.

As previously stated, the sizing roller unit is movably held so that it may be readily dropped from its operative relation to the presses down into an inoperative relation, so that it will be out of the way and thereby permit feeding the candy rope to the presses in any other desired manner. For instance, the rope may be formed and fed by hand when the machine is to be used simply as a cutting machine with the plunger dies removed. To this end the main frame including the sides 100, 101 are pivotally supported upon the shaft 103. A holding bracket 110 in the form of an inverted L-shaped member is fastened to the end of the main frame sides of the machine at the ears 111. This bracket 110 at its upper end extends forwardly and has holding openings 143 and 143' in which the holding pin is inserted, depending upon the operative or inoperative position of the forming roll frame. The dotted line with the arrows running from hole 143 to hole 143' indicates the extent of movement of the movable frame. The upper end of this bracket 110 comprises two sides between which the bracket 142 carried by the roller frame extends. This bracket 142 is supported by the tie rods 112, 113 extending between the sides of the roller frame, and said bracket 142 has an upwardly extending arm which passes between the sides of bracket 110 as stated, having a hole in the end through which the pin passes to register either with hole 143 or 143'. With the roller frame in its operative position the pin is in the hole 143'. To drop the frame, the pin is removed from hole 143, thereby allowing the frame to be dropped until the hole in the end of bracket 142 registers with the hole 143', at which time the pin may again be inserted to hold the frame from dropping down too far.

It will thus be seen that I have provided sizing mechanism which may be readily moved as a unit from operative relation with the presses to an inoperative relation and vice versa, and in which the rollers may be readily adjusted according to the size of rope desired, and also heated to advantage when necessary.

What I claim as new and desire to secure by United States Letters Patent is:—

1. A plastic candy forming machine including a plurality of presses, means for operating the presses to successively act upon a continuous plastic candy rope fed to the machine, roller mechanism in operative relation to and driven with the machine for forming and feeding a plastic candy rope to the presses, and means for readily shifting said mechanism out of operative relation to permit feeding the rope by hand.

2. A plastic candy forming machine including a plurality of presses, means for operating the presses to successively act upon a continuous plastic candy rope fed to the machine, roller mechanism driven with the presses for forming and feeding a plastic candy rope to the presses, a frame for supporting said roller mechanism in operative relation to the presses, and means for shifting said frame to move the rollers out of operative relation to the presses and permit feeding the rope independent of the roller mechanism.

3. A plastic candy forming machine including a plurality of presses, means for operating the presses to successively act upon a continuous plastic candy rope fed to the machine, roller mechanism driven with the presses for forming and feeding a plastic candy rope to the presses, a frame pivotally mounted and supporting the roller mechanism in operative relation to the presses, and means for dropping the frame on its pivot to lower the rollers out of operative relation to the presses and permit feeding the rope independent of the roller mechanism.

4. A plastic candy forming machine including a plurality of presses, means for operating the presses to successively act upon a continuous plastic candy rope fed to the machine, a unit roller mechanism having a pair of rollers in operative relation to and driven with the presses for forming and feeding a plastic candy rope to the presses, and means to drop the roller mechanism temporarily out of operative relation without disconnecting the driving means for the rollers.

5. A plastic candy forming machine including a plurality of presses, means for operating the presses to successively act upon a continuous plastic candy rope fed to the machine, a unit roller mechanism having a pair of rollers in operative relation to and driven with the presses for forming and feeding a plastic candy rope to the presses, means to drop the roller mechanism temporarily out of operative relation without disconnecting the driving means for the rollers, and means included in the unit for adjusting the rollers to vary the size of the rope formed thereby.

6. A plastic candy forming machine including press mechanism for acting upon a continuous plastic candy rope fed to the machine, a unit frame mounted upon said machine, a rope forming and feeding roller supported by said frame, a second frame pivotally supported by said first frame and carrying a roller in operative relation to the first roller for forming and feeding a candy rope to said press mechanism, and means for adjusting the second frame to vary the spacing of the rollers for varying the size of the candy rope formed thereby.

7. A plastic candy forming machine including press mechanism for acting upon a continuous plastic candy rope fed to the machine, a unit frame mounted upon said machine, a rope forming and feeding roller supported by said frame, a second frame pivotally supported by said first frame and carrying a roller in operative relation to the first roller for forming and feeding a candy rope to said press mechanism, means for adjusting the second frame to vary the spacing of the rollers for varying the size of the candy rope formed thereby, and means for readily dropping said unit frame to move said rollers out of operative feeding relation to said press mechanism.

8. A plastic candy forming machine including two sections of component successively cooperating die blocks, each section containing a different number of like series of dies, said series of the two sections having a common multiple whereby corresponding dies of the series always meet for cooperation.

9. A plastic candy forming machine including two sections of component successively cooperating die blocks, each section containing a different number of like series of dies, each series having dies of different shapes but the series being alike, said series of the two sections having a common multiple whereby corresponding dies of the series always meet for cooperation.

10. A plastic candy forming machine including two sections of component successively cooperating die blocks, each section containing a different number of like series of dies, each series having dies of different shapes but the series being alike, said series of the two sections having a common multiple whereby corresponding dies of the series always meet for cooperation, and means for readily changing the dies to have like or different shapes for each series.

11. A plastic candy forming machine including two sections of component successively cooperating die blocks, two endless traveling members each carrying the die blocks of one section over a circuitous path and into cooperation, each section containing a different number of like series of dies, said series of the two sections having a common multiple whereby corresponding dies of the series always meet for cooperation.

12. A plastic candy forming machine including two sections of component successively cooperating die blocks, two endless traveling members each carrying the die blocks of one section over a circuitous path and into cooperation, each section containing a different number of like series of dies, each series having dies of different shapes but the series being alike, said series of the two sections having a common multiple whereby corresponding dies of the series always meet for cooperation.

13. A plastic candy forming machine including two sections of component successively cooperating die blocks, two endless traveling members each carrying the die blocks of one section over a circuitous path and into cooperation, each section containing a different number of like series of dies, each series having dies of different shapes but the series being alike, said series of the two sections having a common multiple whereby corresponding dies of the series always meet for cooperation, and means for readily changing the dies to have like or different shapes for each series.

14. A plastic candy forming machine including two endless carriers supported to move over circuitous horizontal plane paths, component cooperating press sections supported by said carriers each section including a side die and a top or bottom die, and means for effecting successive cooperation of meeting component press sections to progressively act upon a continuous rope of plastic candy fed to the machine.

15. A plastic candy forming machine including two endless carriers supported to move over circuitous horizontal plane paths, component cooperating press sections supported by said carriers each section of one carrier including a top and a side die and each section of the other carrier including a bottom and a side die, and means for effecting successive cooperation of meeting component press sections to progressively act upon a continuous rope of plastic candy fed to the machine.

16. A plastic candy forming machine including two endless carriers supported to move over circuitous horizontal plane paths, component cooperating press sections supported by said carriers each section including a cutting and a plunger die, and means for effecting successive cooperation of meeting component press sections to progressively act upon a continuous rope of plastic candy fed to the machine.

17. A plastic candy forming machine including two endless carriers supported to move over circuitous horizontal plane paths, component cooperating press sections supported by said carriers each section including a cutting and a plunger die, and means for effecting successive cooperation of meeting component press sections to progressively act upon a continuous rope of plastic candy fed to the machine by bringing the cutting dies together to form tubular chambers and then bringing the plunger dies together to seal the chamber and compress the candy.

18. A plastic candy forming machine including two endless carriers supported to move over circuitous horizontal plane paths, component cooperating press sections supported by said carriers each section including a cutting and a plunger die, said sections being spaced to effect successive meetings of component sections, and means for effecting cooperation of meeting sections to progressively act upon a continuous rope of candy fed to the machine.

19. A plastic candy forming machine including two endless carriers supported to move over circuitous horizontal plane paths, component cooperating press sections supported by said carriers each section including a cutting and a plunger die, said sections being spaced to effect successive meetings of component sections with one cutting die superimposed over the other and the plunger dies laterally disposed, and means for effecting cooperation of meeting sections to progressively act upon a continuous rope of candy fed to the machine.

20. A plastic candy forming machine including two chains each supported by two sprockets each carried upon a vertically extending shaft, means for driving the chains over circuitous paths in a horizontal plane, a guiding track above each chain, component cooperating press sections supported upon said tracks and connected with said chains, and means for effecting successive cooperation of meeting press sections to progressively act upon a continuous rope of plastic candy fed to the machine.

21. A plastic candy forming machine including two chains each supported by two sprockets each carried upon a vertically extending shaft, means for driving the chains over circuitous paths in a horizontal plane, a guiding track above each chain, component cooperating press sections supported upon said tracks and connected with said chains, and means including a suitable cam positioned relative to each circuitous path and operating elements carried by the press sections and engaging the cams for effecting successive cooperation of meeting press sections to progressively act upon a continuous rope of plastic candy fed to the machine.

22. A plastic candy forming machine including a die carrying arm having a right angular corner in an end thereof, a stud projecting from one face of the corner, a spring pressed stud projecting from the other face of the corner and having a handle for withdrawing the latter stud from the corner, and a die block having an angular portion fitting into the angular corner of the arm and having openings to receive the stud so as to hold the block but permit ready removal by withdrawing the spring pressed stud.

23. A plastic candy forming machine including press mechanism for acting upon a continuous plastic candy rope fed to the machine, a unit frame mounted upon said machine, a rope forming and feeding roller supported by said frame, a second frame pivotally supported by said first frame and carrying a roller in operative relation to the first roller for forming and feeding a candy rope to said press mechanism, means for adjusting the second frame to vary the spacing of the rollers for varying the size of the candy rope formed thereby, and side sizing members contacting with the sides of the rollers so as to permit said adjustment thereof.

In witness whereof, I hereunto subscribe my name this 14th day of June, 1926.

ROBERT F. MORRISON.